US009495653B2

(12) United States Patent
Hama et al.

(10) Patent No.: US 9,495,653 B2
(45) Date of Patent: *Nov. 15, 2016

(54) STACK HANDLING OPERATION METHOD, SYSTEM, AND COMPUTER PROGRAM

(71) Applicant: International Business Machines Corporation, Armonk, NY (US)

(72) Inventors: Toshiyuki Hama, Tokyo (JP); Hiroki Yanagisawa, Tokyo (JP); Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/013,605

(22) Filed: Aug. 29, 2013

(65) Prior Publication Data

US 2014/0074541 A1   Mar. 13, 2014

(30) Foreign Application Priority Data

Sep. 11, 2012   (JP) ................................ 2012-199414

(51) Int. Cl.
*G06Q 10/06* (2012.01)
*B66C 1/00* (2006.01)
*B66C 23/58* (2006.01)

(52) U.S. Cl.
CPC ........... *G06Q 10/06315* (2013.01); *B66C 1/00* (2013.01); *B66C 23/58* (2013.01); *G06Q 10/063* (2013.01)

(58) Field of Classification Search
CPC ................ G08B 13/2462; G08B 25/10; A63F 13/00; A63F 13/04; A63F 2300/1012; A63F 2300/1093; A63F 2300/6045
See application file for complete search history.

(56) References Cited

U.S. PATENT DOCUMENTS 6,182,843 B1 *   2/2001   Tax .......................... B66C 13/46
                                                                  212/270
6,377,867 B1 *   4/2002   Bradley ............... B65G 1/1376
                                                                  700/216

(Continued)

FOREIGN PATENT DOCUMENTS

JP          07290125 A     11/1995
JP       2011105483 A      6/2011

OTHER PUBLICATIONS

Roger Crawfis, Introduction to Algorithms Shortest Paths, CSE 680 presentation, Accessible at http://web.cse.ohio-state.edu/~crawfis/cse680/Slides/ , Dec. 2, 2009, Accessed on Jun. 19, 2015.*
Carnegie Mellon University Department of Computer Science, Cooking for Computer Scientists, CS 15-251, Accessible at http://www.cs.cmu.edu/afs/cs.cmu.edu/academic/class/15251-s08/Site/Materials/Lectures/Lecture03/lecture03.pdf , Jan. 22, 2008, Accessed on Jun. 19, 2015.*

(Continued)

*Primary Examiner* — Anita Coupe
*Assistant Examiner* — Matthew H Divelbiss
(74) *Attorney, Agent, or Firm* — Cantor Colburn LLP; David Quinn

(57) ABSTRACT

A method for searching transition routes from an initial state of a plurality of stackable items to a target state by a computer at predetermined conditions includes connecting between transitionable states at an edge by a single handling operation transitioning from the initial state to the target state, to generate a state space graph; evaluating a lower bound of handling operation cost from a certain state to the target state, based on both the stacking sequence of the plurality of items in the certain state and the stacking sequence of the plurality of items in the target state; and searching a route from the initial state to the target state where the handling operation cost is minimal on the state space graph using a heuristic search algorithm based on the lower bound.

13 Claims, 14 Drawing Sheets

(56) References Cited

U.S. PATENT DOCUMENTS

| | | | | |
|---|---|---|---|---|
| 6,886,251 | B1* | 5/2005 | Andrews | B21D 47/01 29/407.1 |
| 2002/0191813 | A1* | 12/2002 | Uchida | B66C 13/085 382/100 |
| 2007/0065259 | A1* | 3/2007 | Talley | B65G 1/0407 414/279 |
| 2009/0322510 | A1* | 12/2009 | Berger | H04W 60/00 340/539.1 |
| 2010/0145501 | A1* | 6/2010 | Guilbert | G06Q 10/067 700/218 |
| 2011/0082586 | A1* | 4/2011 | Nishihara | B25J 9/0093 700/259 |
| 2011/0135424 | A1* | 6/2011 | Amoss, Jr. | B65G 67/603 414/137.9 |

OTHER PUBLICATIONS

Henry Kautz, CSE 326: Data Structures, Part 8, Graphs, CSE 326 presentation, Accessible at http://courses.cs.washington.edu/courses/cse326/02au/lectures/ , Dec. 2, 2002, Accessed on Jun. 19, 2015.*

Dorothea Wagner et al., Speed-Up Techniques for Shortest-Path Computations, Accessible at courses.csail.mit.edu/6.006/fall10/handouts/wagner.pdf , W. Thomas and P. Weil (Eds.): STACS 2007, LNCS 4393, pp. 23-36, 2007.*

Peter Cowling, A flexible decision support system for steel hot rolling mill scheduling, Computers & Industrial Engineering 45 (2003) 307-321, 2003 Elsevier Science Ltd.*

* cited by examiner

Target State

FIG. 7 A
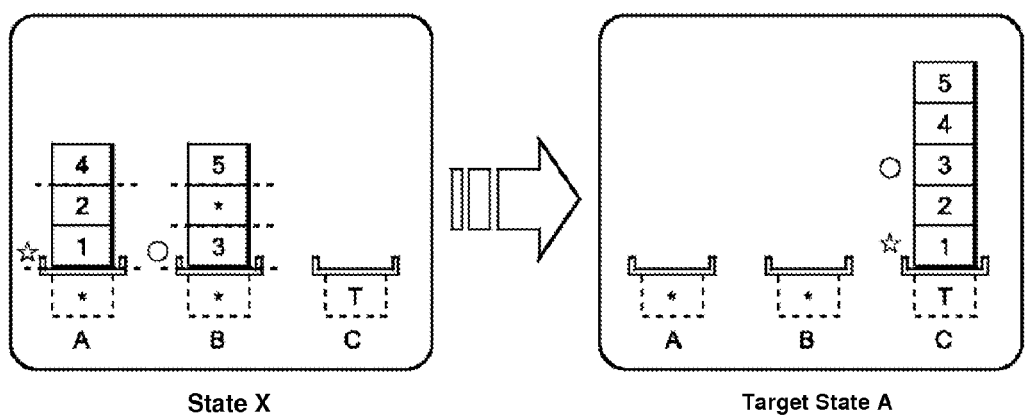
State X → Target State A
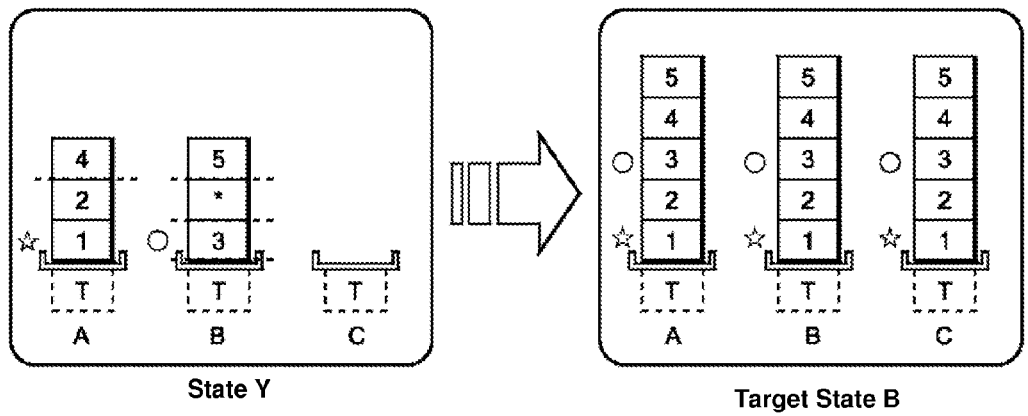
State Y → Target State B
FIG. 7 B Target State

FIG. 13

| Instance<br>Initial State | method | Number of<br>expanded nodes<br>(closed Nodes) | Number of<br>unexpanded nodes<br>(open Nodes) | Calculating<br>Time<br>(seconds) |
|---|---|---|---|---|
| 1,6,3,4,5,2,7 | Dijkstra | 121,486 | 388,086 | 133 |
| | Embodiment 1 | 301 | 3,632 | 0(<1) |
| | Embodiment 2 | 154 | 1,973 | 0(<1) |
| 2,7,3,4,5,6,1 | Dijkstra | 29,000 | 279,246 | 26 |
| | Embodiment 1 | 40 | 449 | 0(<1) |
| | Embodiment 2 | 38 | 419 | 0(<1) |
| 5,4,3,7,6,1,2 | Dijkstra | 72,222 | 484,965 | 72 |
| | Embodiment 1 | 46 | 531 | 0(<1) |
| | Embodiment 2 | 34 | 426 | 0(<1) |

FIG. 14

| Instance<br>Initial State | method | Number of<br>expanded nodes<br>(closed Nodes) | Number of<br>unexpanded nodes<br>(open Nodes) | Calculating<br>Time<br>(seconds) |
|---|---|---|---|---|
| 5,6,7,4,16,1,11,3,9,2,8,10,12,14,15,13 | Embodiment 1 | 5,778 | 188,632 | 8 |
| | Embodiment 2 | 3,237 | 105,522 | 5 |
| 1,16,9,3,7,5,14,2,15,8,10,6,11,12,4,13 | Embodiment 1 | 3,465 | 104,228 | 4 |
| | Embodiment 2 | 3,759 | 113,543 | 6 |
| 9,15,14,11,16,13,10,2,6,3,5,12,1,4,8,7 | Embodiment 1 | 14,273 | 466,793 | 21 |
| | Embodiment 2 | 7,773 | 252,935 | 14 |
| 1,6,8,5,4,3,7,2,15,11,16,14,13,10,12,9 | Embodiment 1 | 61,078 | 1,987,629 | 105 |
| | Embodiment 2 | 29,127 | 1,044,994 | 67 |
| 2,6,1,5,3,4,8,7,10,14,9,13,11,12,16,15 | Embodiment 1 | 25,400 | 897,160 | 44 |
| | Embodiment 2 | 6,142 | 218,234 | 13 |
| 6,3,1,4,2,7,8,5,12,14,11,15,9,10,16,13 | Embodiment 1 | 2,240 | 65,024 | 2 |
| | Embodiment 2 | 1,530 | 51,809 | 3 |

STACK HANDLING OPERATION METHOD, SYSTEM, AND COMPUTER PROGRAM

PRIORITY

This application claims priority to Japanese Patent Application No. 2012-199414, filed 11 Sep. 2012, and all the benefits accruing therefrom under 35 U.S.C. §119, the contents of which in its entirety are herein incorporated by reference.

BACKGROUND

The present invention relates to a stack handling operation technology, and more particularly to technology for providing a faster stack handling operation sequence with as little cost as possible when restacking a plurality of stackable items from an initial state to a target state.

In industry, restacking may be necessary for a plurality of stackable items from an initial state to a target state in various situations. For example, in a steel plant with two consecutive processes including a steel manufacturing process and a hot rolling process, manufactured products and semi-manufactured products that weight 10 tons or more are stacked as interim inventory. These manufactured products and semi-manufactured products are fundamentally all unique, and because the output sequence of items from the steel manufacturing process and the input sequence for the rolling process are generally different, the stacked items are required to be sorted by a crane into the sequence of treatment by the hot rolling process. Reducing the cost of sorting (normally defined as the number of crane operations) is extremely important, leading not only to cost reduction, but also leading to improvement in throughput before and after processing. Currently, creation of the crane handling operation sequence is left to the intuition and experience of the crane operator (human), creating a large potential loss.

Furthermore, generally, automatic creation of a production schedule by a computer is possible for the hot rolling process and the like. When the production schedule is created by a computer, a huge number of production schedule candidates are created. In this case, the cost of sorting before the hot rolling process is preferably considered for each candidate. In order to implement this, an approximate solution (a specific handling operation sequence is not required, but a rough calculation of only the cost is sufficient) must be calculated at high speed.

Background references include Japanese Unexamined Patent Application 2011-105483 and Japanese Unexamined Patent Application H07-290125.

SUMMARY

In one embodiment, a method for searching transition routes from an initial state of a plurality of stackable items to a target state by a computer at predetermined conditions includes connecting between transitionable states at an edge by a single handling operation transitioning from the initial state to the target state, to generate a state space graph; evaluating a lower bound of handling operation cost from a certain state to the target state, based on both the stacking sequence of the plurality of items in the certain state and the stacking sequence of the plurality of items in the target state; and searching a route from the initial state to the target state where the handling operation cost is minimal on the state space graph using a heuristic search algorithm based on the lower bound.

In another embodiment, a computer that searches a transition route from the initial state of the plurality of stackable items to the target state, at predetermined conditions includes means for connecting between transitionable states at an edge by a single operation transitioning from the initial state to the target state, to generate a state space graph; means for calculating the lower bound of the handling operation cost from a certain state to the target state, based on the stacking sequence of the plurality of items in the certain state and the stacking sequence of the plurality of items in the target state; and means for searching a route from the initial state to the target state where the handling operation cost is minimal on the state space graph using a heuristic search algorithm based on the lower bound.

BRIEF DESCRIPTION OF THE SEVERAL VIEWS OF THE DRAWINGS

FIGS. 7A and 7B is a schematic diagram describing a counting method of evaluation function $h^{(1)}$;

FIG. 12 is a schematic diagram further describing the calculation of a;

FIG. 13 is a diagram describing the results of test 1; and

FIG. 14 is a diagram describing the results of test 2.

DETAILED DESCRIPTION

Figure 1:
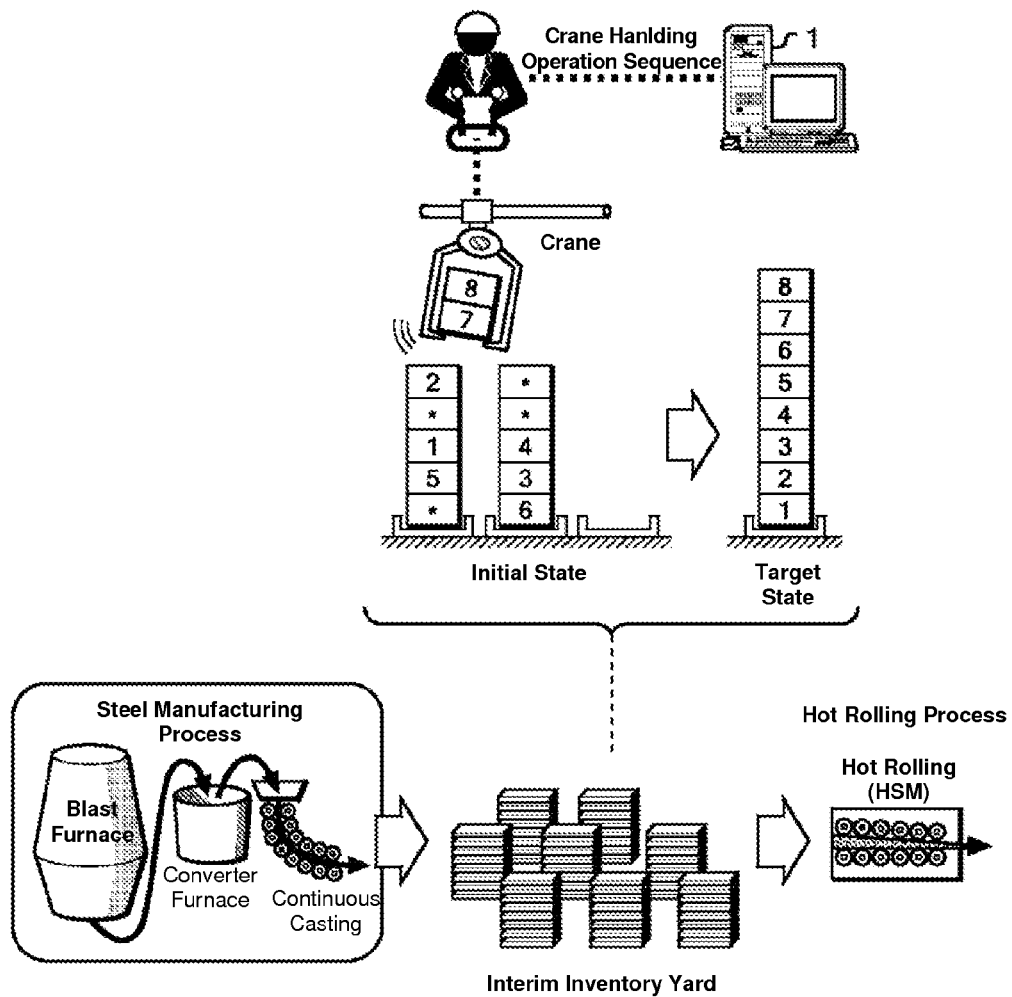
FIG. 1 is a schematic diagram illustrating the utilization aspects of a computer according to the present embodiment.

An object of the present invention is to provide a method that determines a handling operation sequence that reduces (preferably minimizes) restacking costs when an initial stacked state and a target state are provided for a plurality of items. Furthermore, another object is to provide a method for calculating at high speed an approximate solution (cost only, not the handling operation sequence itself) that is required by a scheduler of the upstream process or downstream process.

An embodiment of the present invention is a method for searching transition routes from an initial state of a plurality of stackable items to a target state by a computer at predetermined conditions, including: connecting between transitionable states by a single handling operation at an edge in the paths from the initial state to the target state, and generating a state space graph; evaluating a lower bound of handling operation cost from a certain state to the target state, based on the stacking sequence of the plurality of items in the certain state, and the stacking sequence of the plurality of items in the target state; and searching a route from the initial state to the target state where the handling operation cost is minimal on the state space graph using a heuristic search algorithm based on the lower bound.

Herein, the lower bound can be evaluated in the evaluation step based on the number of points where the stacking sequence of the plurality of items in the certain state differs from the stacking sequence of the plurality of items in the target state. Furthermore, a counting method for the number of different points can be modified, based on whether the target state is a state where the plurality of items are stacked to a specific location from a plurality of locations, or whether the target state is a state where the plurality of items are stacked to an arbitrary location of the plurality of locations.

Furthermore, recording, onto a recording means of a computer, a stacking sequence where a fewer number of items than the plurality of items can be taken, and the optimal section handling operation cost thereof, can be included prior to the evaluating, and the lower bound can be calculated in the evaluating based on the section handling operation cost. More specifically, the evaluating includes: splitting the plurality of items in the certain state into a plurality of sections; reading the section handling operation cost that corresponds to each split section from the recording means of the computer; and calculating the lower bound, based on the sum of the section handling operation costs.

Note that lower bound can be calculated based on the connectivity between the split sections, and splitting the plurality of sections can be done such that more items are included in one section, within the extent of being recorded in the recording means of the computer.

Furthermore, the handling operation cost can simply be the number of operations, and can be a function based on the ease of the handling operation and the like. Furthermore, the heuristic search algorithm can be A* (A star) algorithm. Herein, the lower bound can be the evaluation value of the heuristic function.

Furthermore, a condition that restricts stacking of the plurality of items, a condition that restricts the number and weight of the movable items by one handling operation, and a condition that restricts overall height of the stackable items can be included as the predetermined condition, wherein the step of generating the state space graph can generate the state space graph based on these conditions.

The items can be steel products after a steel manufacturing process and before a hot rolling process; the initial state can be a stacking state of the plurality of steel products after the steel manufacturing process; and the target state can be the stacking state of the plurality of steel products for the hot rolling process. In this case, the operation can be a crane operation, and can further include a step of outputting a route where the operating cost is minimal, obtained by the searching step, as the crane operation sequence. Furthermore, a step can be provided for outputting the operating cost obtained by the searching step to a steel production scheduler. Furthermore, a step can be provided for outputting the operating cost obtained by the searching step, by responding to a query that includes the initial state and the target state from the steel production scheduler.

Understanding the present invention as a computer program or computer system can essentially provide the same technical characteristics as understanding the method of the present invention.

According to the present invention, a method can be provided for determining a handling operation sequence that reduces (preferably minimizes) the restacking cost when an initial stacked state and a target state are provided for a plurality of items. Furthermore, a method can be provided for calculating at high speed an approximate solution (cost only and not the handling operation sequence itself) that is required by a scheduler of the upstream process or downstream process.

FIG. 1 is a schematic diagram illustrating the utilization aspects of a computer 1 according to the present embodiment. Herein, the computer 1 is used in the steel industry. In the steel industry, because semi-manufactured products (hereinafter called items) manufactured by a steel manufacturing process are sent to a hot rolling process, which is a subsequent process, an interim inventory yard is provided for temporarily storing the products. Herein, the items must be restacked from the state where the items are discharged from the steel manufacturing process (initial state) to the state (target state) where the items are made suitable for the hot rolling process, which is the subsequent process, and the computer 1 calculates the optimal handling operation sequence that performs the operation of restacking. Furthermore, automatic creation of a production schedule by a computer system is possible for the steel manufacturing process, the hot rolling process, and the like. When the production schedule is created by a computer system, a huge number of production schedule candidates are created. Herein, the computer 1 can calculate at high speed the approximate solution of restacking costs after the steel manufacturing process and before the hot rolling process for each candidate. As a result, the computer system can create a better production schedule. In this case, the computer 1 can be configured integrally with or separately from the computer system.

Figure 2:
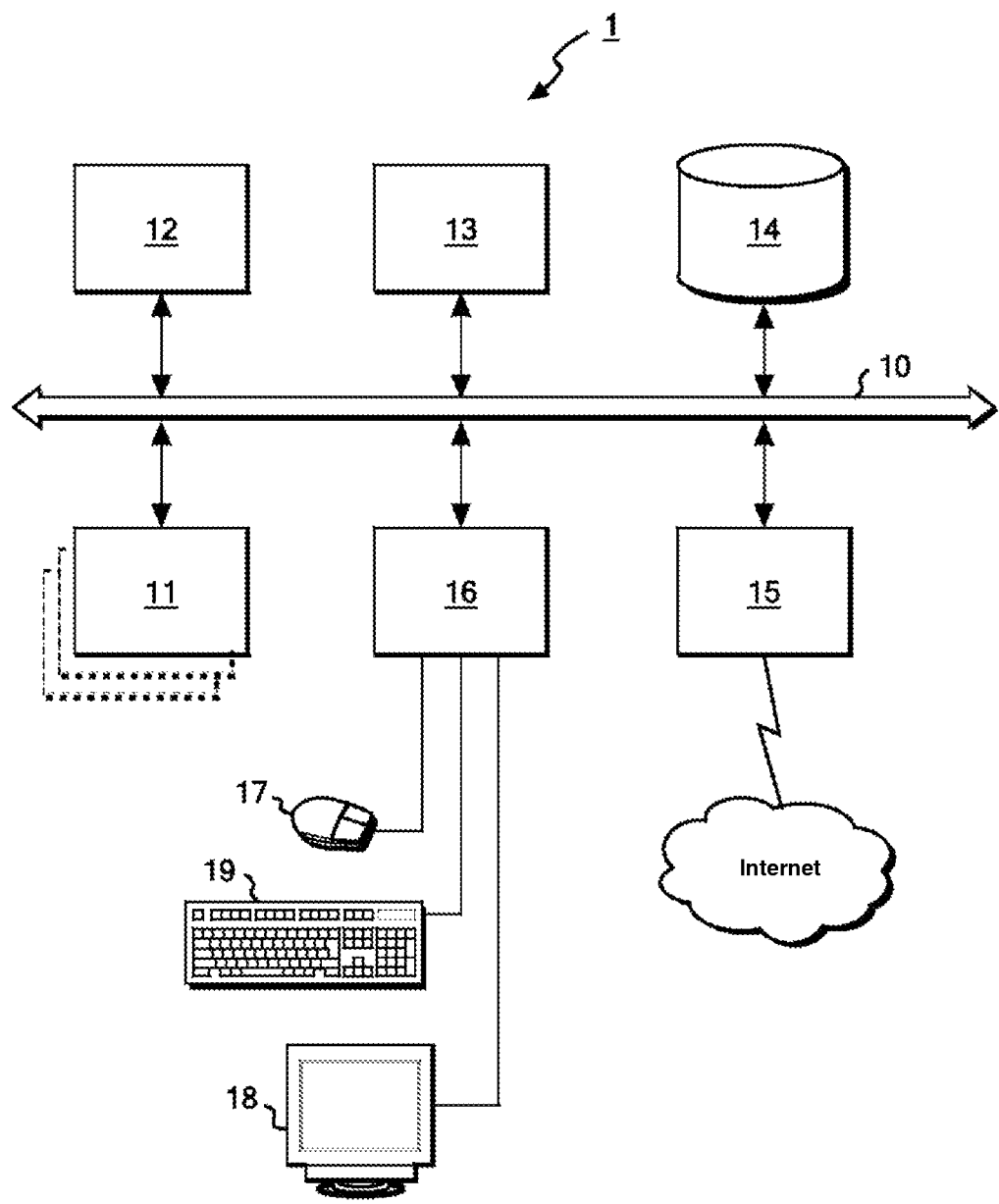
FIG. 2 is a block diagram illustrating the hardware configuration of the computer according to the present embodiment.

FIG. 2 is a block diagram illustrating the hardware configuration of the computer 1. The hardware configuration of the computer 1 provides a bus 10 (low speed and high speed), a CPU (arithmetic and control unit) 11 that is connected to the bus 10, RAM (random access memory: recording device) 12, ROM (read only memory: recording device) 13, an HDD (hard disk drive: recording device) 14, a communication interface 15, and an input-output interface 16. Furthermore, a mouse (pointing device) 17 that is connected to the input-output interface 16, a flat panel display (display device) 18, a keyboard 19, and the like are provided. Note the computer 1 is described as a computer that uses general personal computer architecture, but the CPU 11, HDD 14, and the like can be multiplexed, if higher data throughput or availability is required for example. Furthermore, various types of computer systems can be used, such as a personal computer like a desktop, or even a laptop, a tablet, and the like.

The hardware configuration of the computer 1 provides an operating system (OS) that provides basic functions, application software that uses the OS functions, and driver software for the input-output devices. Each software is stacked along with various data on the RAM 12, executed by the CPU 11 or the like, and the computer 1 as a whole is configured into functional modules illustrated in FIG. 3, and executes the process illustrated in FIG. 4.

Figure 3:
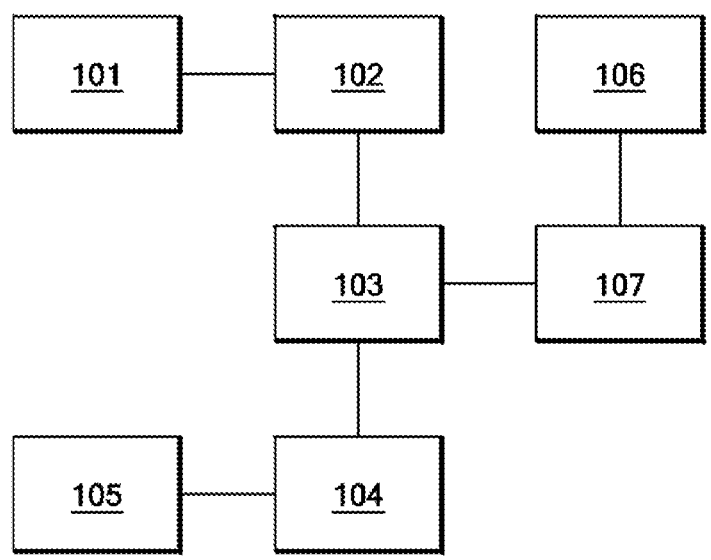
FIG. 3 is block diagram describing the functional modules of the computer.

FIG. 3 is a functional block diagram describing the functions of the computer 1. The computer 1 provides an input module (inputting means) 101, a generation module (generating means) 102, an evaluation module (evaluating means) 103, a search module (searching means) 104, and an output module (outputting means) 105. The computer 1 further provides a preliminary calculation module (preliminary calculating means) 106, and a pattern database (DB) (recording means) 107.

Figure 4:
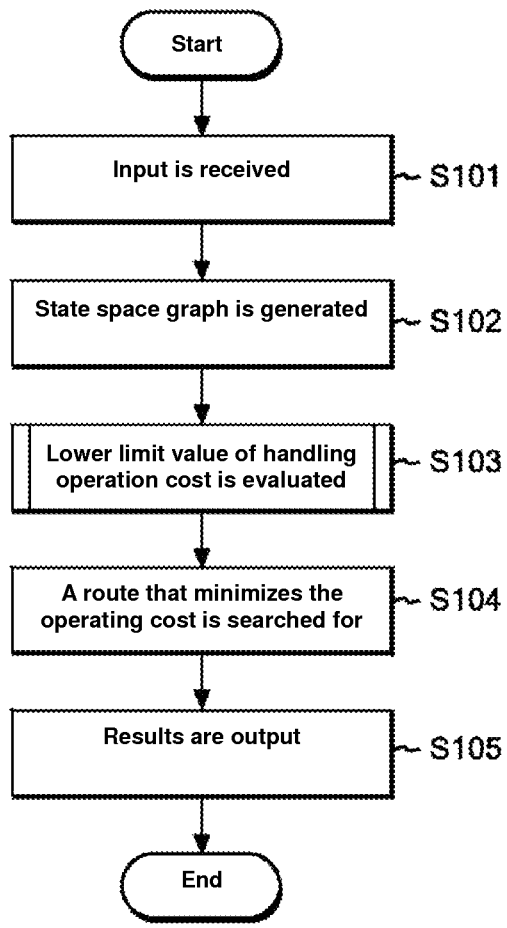
FIG. 4 is a flow chart describing processes executed by the computer.

FIG. 4 is a flow chart describing the processes of the computer 1. The processes executed by the computer 1 are described below based on the flow chart.

First, the input module 101 receives input (S101). Information indicating the initial state and the target state of the items (refer to FIG. 5), and a variety of restriction information can be included as inputted information. The restriction information can include information that restricts the stacking of the plurality of items, information that restricts the number or weight of movable items by a single crane handling operation, information that restricts the overall height of the plurality of stackable items, and the like. Note that a relationship between the size of items that can be on the upper side and the size of items that can be on the lower side is an example of the information that restricts the stacking of the plurality of items, from the perspective of safety. Furthermore, the maximum number and maximum weight are examples of the information that restricts the number and weight of the movable items by a single crane handling operation, from the perspective of crane specifications and safety. Furthermore, the maximum overall height that is stackable in one place is an example of the information that restricts the overall height of the plurality of stackable items, from the perspective of safety. In addition, various operational requirements can be input as restriction information. For example, restriction of the number of locations in the interim inventory yard, improvement of utilization rate of the interim inventory yard, leveling of the height of items to be stacked, and the like are included.

Thus, the inputted information can be input from a user (operator) to the computer 1 using the keyboard 19 and mouse 17, or from a production scheduler that schedules the steel manufacturing process, the hot rolling process, and the like. If the production scheduler is on a separate computer system, the information is input through the communication interface 15, and if the production scheduler is on the computer 1, the information is input by a file exchanger for example. Note that all the information inputted can be input from the user or the production scheduler, or a part of the information can also be input from the user, and the other part from the production scheduler. Furthermore, a part of the information can be set by default.

Figure 5:
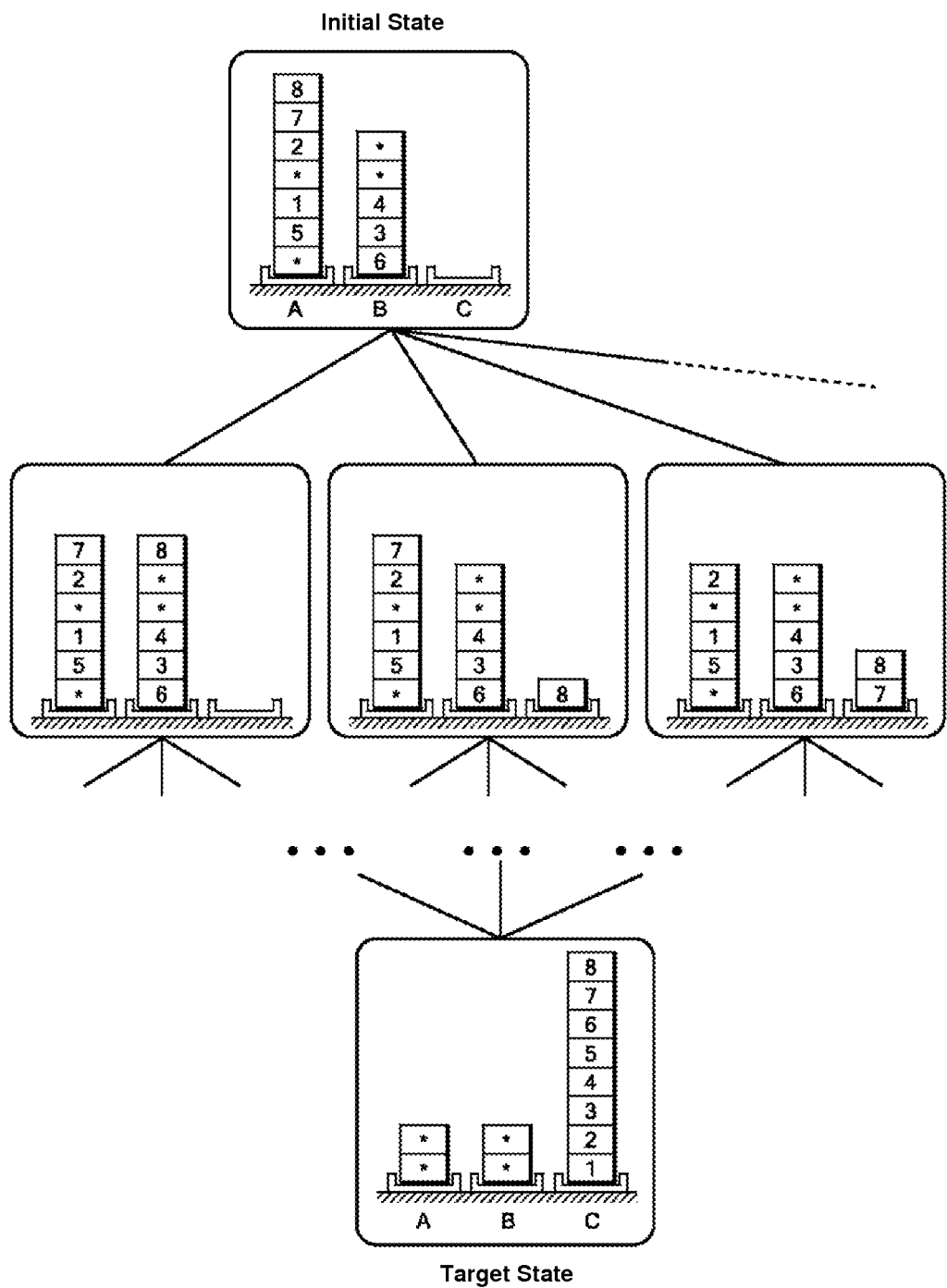
FIG. 5 is a conceptual diagram of the generated state space graph.

Next, the generation module 102 connects the transitionable states at an edge by a single crane handling operation from the previously received initial state to the target state, and generates a state space graph (S102). FIG. 5 is a conceptual diagram of the generated state space graph. As a premise, location A, location B, and location C exist in an interim inventory yard. Furthermore, in the initial state, a stack of items in the order of "*, 5, 1, *, 2, 7, 8" from the bottom exists at location A, a stack of items in the order of "6, 3, 4, *, *" from the bottom exists at location B, and no items exist at location C. On the other hand, in the target state, a stack of items "*, *" exists at both location A and location B, and a stack of items in the order of "1, 2, 3, 4, 5, 6, 7, 8" from the bottom exists at location C. Herein, each number represents a unique item, and "*" represents a arbitrary item. Furthermore, in the process that generates the state space graph, the generation module 102 generates a state space graph based on the aforementioned various restriction information. For example, the state space graph is generated, by considering the maximum number of items that can be lifted by the crane.

Figure 6:
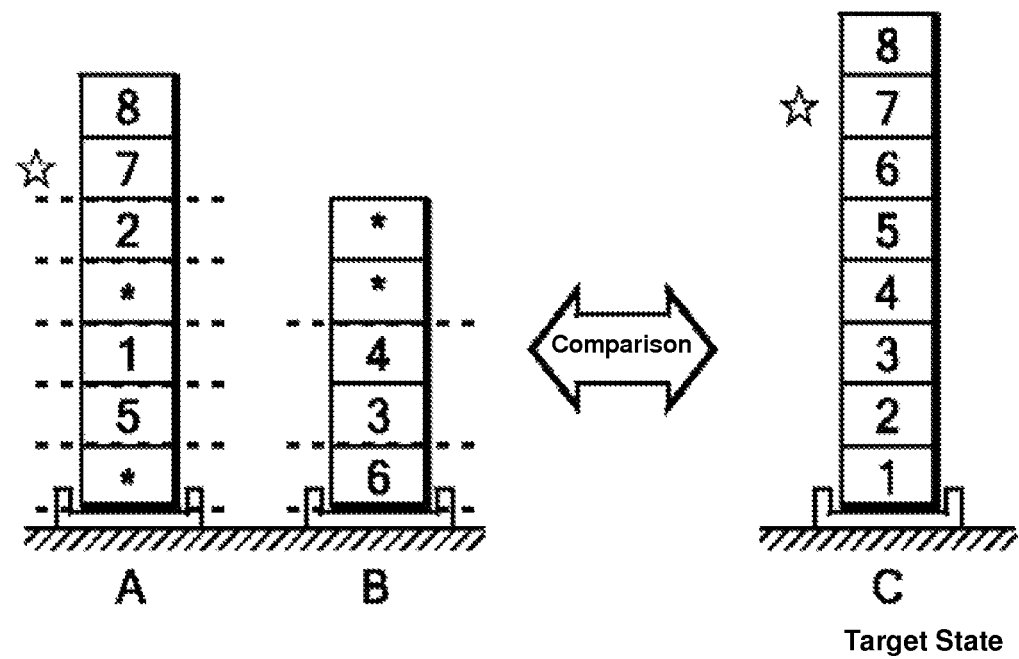
FIG. 6 is a schematic diagram describing the sequence of evaluation.
Figure 8:
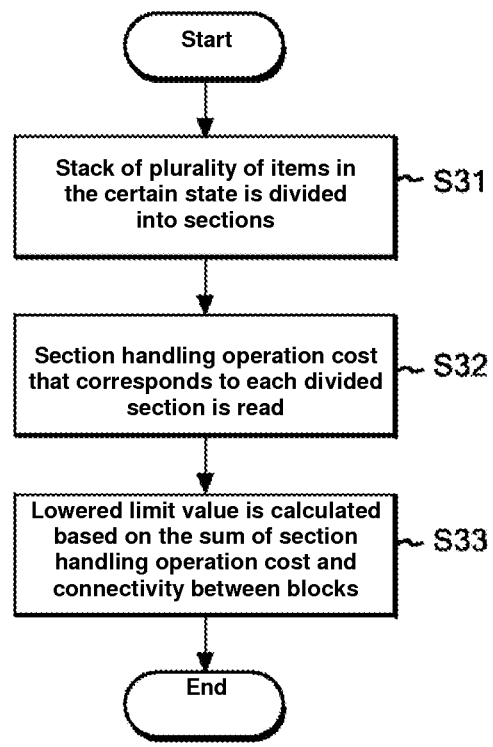
FIG. 8 is a flowchart where an evaluation value of each state is calculated.

Next, the evaluation module 103 evaluates a lower bound of handling operation cost from a certain state to the target state, based on the stacking sequence of the plurality of items in the certain state, and the stacking sequence of the plurality of items in the target state using the aforementioned state space graph (S103). FIG. 6 is a schematic diagram describing the sequence of evaluation. Herein, on the aforementioned state space graph, an optimal crane handling operation sequence can be determined by determining the shortest route from the initial state to the target state. As described later, the shortest route on the graph can be determined by a heuristic search algorithm such as A* or the like, but in order to determine the shortest route more quickly, an accurate and preferable evaluation function is required that calculates the estimated distance from each state to the target state. This is because, assuming the cost from the initial state to a state n is g(n), and assuming the estimated cost from the state n to the target state is h(n), A* searches in the order of g(n)+h(n); therefore, if h(n) is closer to the actual cost, the number of states to be searched can be reduced, and the shortest route can be determined more quickly. This h represents the evaluation function. With the present embodiment, a method of determining the lower bound of each handling operation cost is described below, using the two evaluation functions $h^{(1)}$ and $h^{(2)}$. Note that if a heuristic that calculates the optimal solution is $h^*$, then it holds that $h^{(1)}(x) \leq h^{(2)}(x) \leq h^*(x)$ for an arbitrary state x.

First Embodiment

Evaluation Function $h^{(1)}$

With the first embodiment, for each item included in the target state, the upper and lower items are compared to the target state, and cuts (indicated by a dotted line in the diagram) are inserted at the locations where the upper and lower items are different. The cut indicates that separation is required by the crane handling operation at least once at this location, and the number of cuts is the lower bound for the true optimal solution. For example, while referring to FIG. 6, item "7" that is stacked in location A is the focus (marked with a star in the diagram) in a certain state (herein an initial state). On the other hand, item "7" that is stacked in location C is the focus (marked with a star in the diagram) in the target state. By comparing both, item "8" is above the item "7" in the target state," and item "6" is below. On the other hand, item "8" is above item "7" in the certain state, and because the certain state matches the target state, a cut is not inserted. On the other hand, item "2" is below item "7" in the certain, and because the certain state does not match the target state, a cut is inserted. Similarly, all items are examined, and in this case, cuts in eight locations are inserted, and thus the evaluation function $h^{(1)}$="8".

As described above, location A, location B, and location C exist in the interim inventory yard, and the counting method of the evaluation function $h^{(1)}$ is described for the cases where the stacking position in the target state is restricted or is not restricted. FIG. 7 is a schematic diagram describing the counting method of evaluation function $h^{(1)}$. FIG. 7(a) illustrates a case where the stacking location in the target state is restricted to location C, and FIG. 7(b) illustrates a case where the stacking location in the target state can be any of location A through location C.

As illustrated in FIG. 7(a), when the stacking location of the target state is restricted, a virtual item "T" is deemed to be located below the requested stacking location, and a virtual item "*" is deemed to be located below other stacking locations, so a cut can be inserted using the same rule. For example, item "1" that is stacked in location A is the focus (marked with a star in the diagram) in state X. On the other hand, item "1" that is stacked in location C is the focus (marked with a star in the diagram) in the target state. By comparing both, item "T" is below item "1" in the target state. On the other hand, item "*" is below item "1" in state X, and because state X does not match the target state, a cut is inserted. Similarly, item "3" that is stacked in location B is the focus (marked with a circle in the diagram) in state X. On the other hand, item "3" that is stacked in location C is the focus (marked with a circle in the diagram) in the target state. By comparing both, item "2" is below item "3" in the target state. On the other hand, item "*" is below item "3" in the certain state, and because the certain state does not match the target state, a cut is inserted. Similarly, all items are examined, and in this case, cuts in a total of five locations are inserted, and thus the evaluation function $h^{(1)}$="5".

As illustrated in FIG. 7(b), when the stacking location of the target state is not restricted, the virtual item "T" is deemed to be located below all stacking locations, and therefore cuts can be inserted using the same rule. For example, item "1" that is stacked in location A is the focus (marked with a star in the diagram) in state Y. On the other hand, item "1" that is stacked in locations A through C is the focus (marked with a star in the diagram) in the target state. By comparing both, item "T" is below item "1" in the target state. On the other hand, item "T" is also below item "1" in state X, and because state X matches the target state, a cut is not inserted. Similarly, item "3" that is stacked in location B is the focus (marked with a circle in the diagram) in state Y. On the other hand, item "3" that is stacked in locations A through C is the focus (marked with a circle in the diagram) in the target state. By comparing both, item "2" is below item "3" in the target state. On the other hand, item "T" is below item "3" in the certain state, and because the certain state does not match the target state, a cut is inserted. Similarly, all items are examined, and in this case, cuts are inserted in a total of four locations, and thus the evaluation function $h^{(1)}$="4".

Second Embodiment

Evaluation Function $h^{(2)}$

With the first embodiment, for each item included in the target state, the upper and lower items are compared to the target state, cuts are inserted at the locations where the upper and lower items are different, and an evaluation value (lower bound) of the evaluation function is obtained by counting the number of cuts, but with the second embodiment, an evaluation value can be obtained more efficiently using a preprocessing.

In other words, for a problem where the number of items of the target state is less than or equal to a constant (for example, 5), the preliminary calculation module 106 calculates the optimal solution in advance for every possible permutation (pattern) formed by the items, and records the optimal solution in the pattern database 107. When the evaluation value of each state is calculated, the stack of the plurality of items in the certain state is divided into blocks (sections) in accordance with a certain algorithm (described later) (step S31), and the evaluation value of each block is set by referencing the pattern database 107 (step S32). The evaluation value (lower bound) of the entire original stack of items can provide a better evaluation function $h^{(2)}$ by cal-culating the sum of the evaluation values of each block and the connectivity between blocks (step S33).

Figure 9:
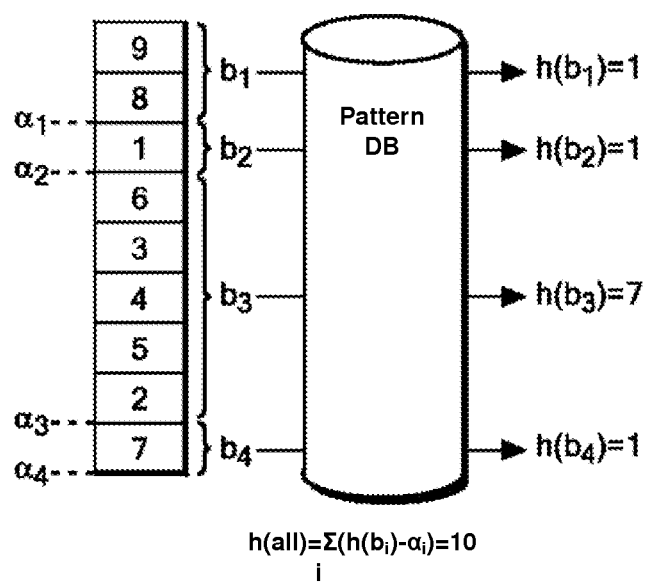
FIG. 9 is a diagram conceptually describing at an advanced level the calculating method of the evaluation function $h^{(2)}$.

FIG. 9 is a diagram conceptually describing the calculating method of the evaluation function $h^{(2)}$. A stack of items "1, 2, 3, 4, 5, 6, 7, 8, 9" in order from the bottom is assumed as the target state. On the other hand, a stack of items "7, 2, 5, 4, 3, 6, 1, 8, 9" in order from the bottom exists in a certain state. The stack is divided into 4 blocks from $b_1$ through $b_4$ in order from top to bottom (described later). In the pattern database 107, for a problem where the number of items of the target state is five or lower, the number of handling operations (number of steps) of the optimal solution is recorded for every possible arrangement (pattern) formed by the items, and the optimal solutions $h(b_1)=1$, $h(b_2)=1$, $h(b_3)=7$, $h(b_4)=1$ are obtained for blocks $b_1$ through $b_4$ respectively. On the other hand, $\alpha_1$ through $\alpha_4$ are defined as 0 or 1 based on the connectivity between the blocks (described later. Herein all are 0). Therefore, the evaluation function $h^{(2)}=\Sigma(h(b_i)-\alpha_i)=10$.

Figure 10:
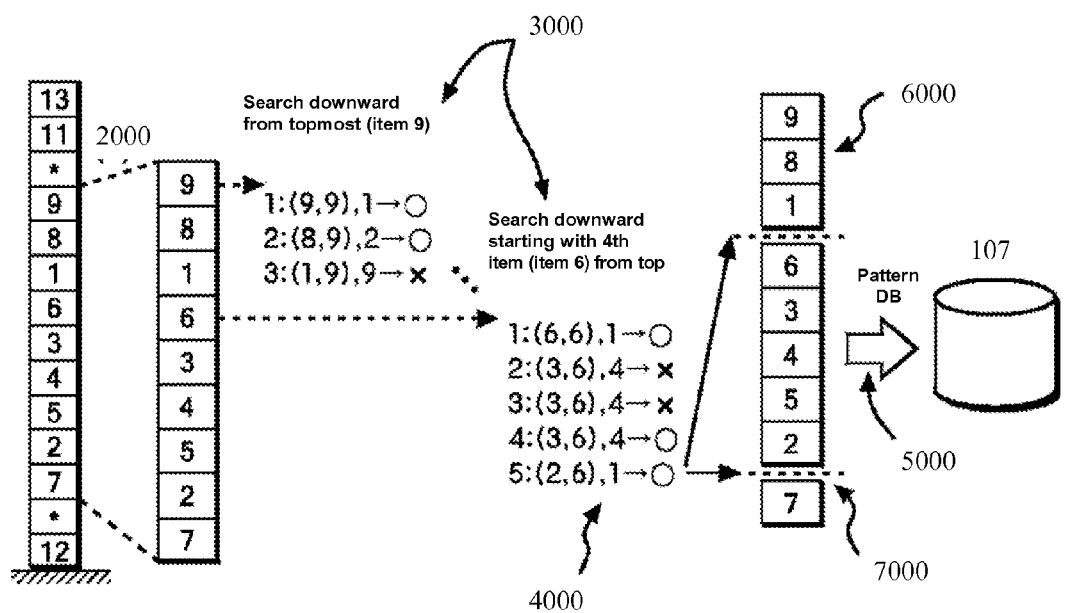
FIG. 10 is a conceptual diagram for describing block splitting and a reference algorithm of a pattern database.

FIG. 10 is a conceptual diagram for describing block splitting and a referencing algorithm of the pattern database 107. Preliminarily, for all permutations 1 through k, the optimal value is calculated, and recorded into the pattern database 107 (in the present embodiment, k=5). In other words, all the optimal solutions where the arrangement of the stack of items is "1", "1, 2", "2, 1" . . . "5, 4, 3, 2, 1) are calculated and recorded in the pattern database 107. Next, if items exist that do not appear in the target state, items are divided in advance on such locations, and the following processes apply to each divided section (refer to (2000) in the diagram). Next, in order to search the longest referable block in the pattern DB, the following processes A and B are repeated in order from the item at the very top of the stack (refer to (3000) in the diagram).

A: the maximum value, minimum value of the items, and the value of "maximum value−minimum value+1" are calculated while scanning downward.

B: if the item number from the top and the calculated value are equal, we can recognize that all items from the top to that item have consecutive numbers (indicated by a circle in FIG. 10).

Next, the largest block is searched by checking all locations (refer to (4000) in the diagram). Herein, the five items from the 4th through the 8th from the top are able to form a block based on the longest series of consecutive numbers. Next, that section is searched for in the pattern database 107 (refer to (5000) in the diagram). At this time, all values are normalized by subtracting the minimum value (the consecutive numbers start from 1). In other words, "6, 3, 4, 5, 2" are normalized so as to start from 1, and the resulting "5, 2, 3, 4, 1" is queried to the pattern database 107, and thus $h(b_3)=7$. Next, the remaining section after obtaining the largest block can recursively apply the algorithm (evaluation function $h^{(2)}$), or can switch to the normal evaluation function $h^{(1)}$ described in the first embodiment (refer to (6000) in the diagram). Next, for the divided section of the block, if the bottommost item of the upper block, and the topmost item of the lower block are consecutive in the target state, then $\alpha=1$, and if not, $\alpha=0$ (refer to (7000) in the diagram). Herein, $\alpha_3=0$.

Figure 11:
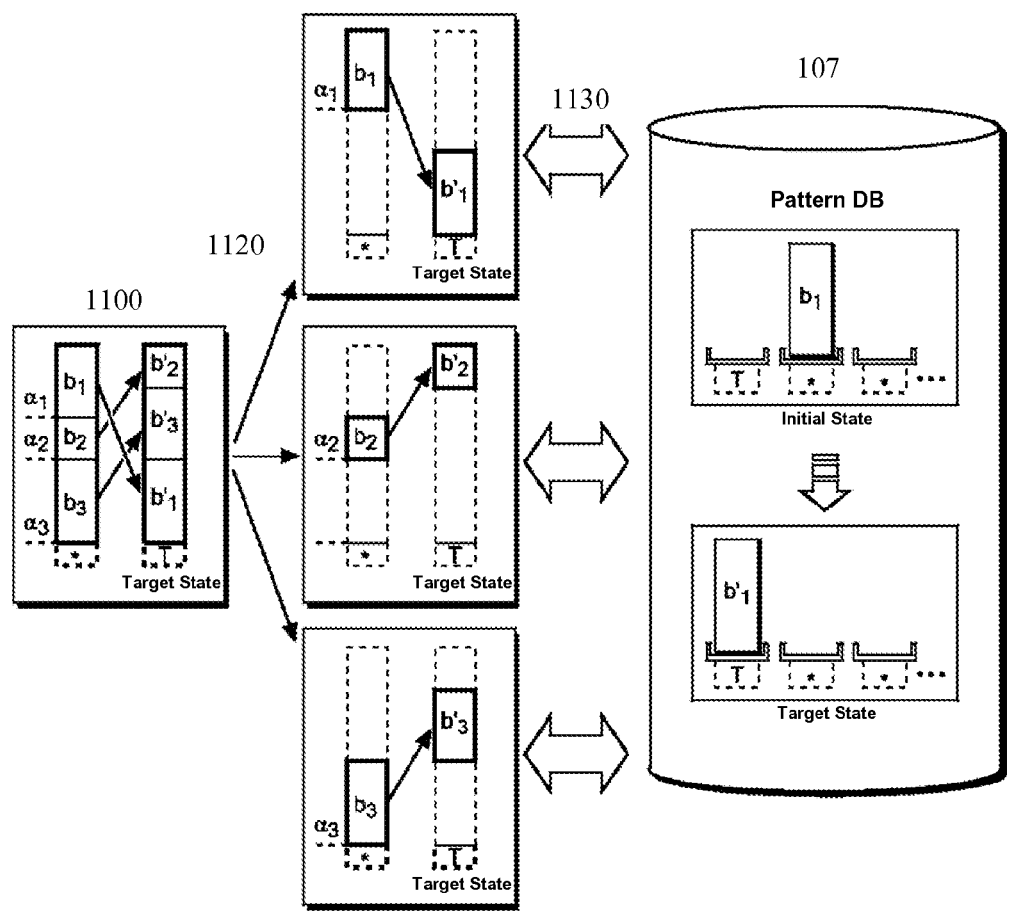
FIG. 11 is a schematic diagram further describing that the evaluation function $h^{(2)}$ is at the lower limit of the optimal solution.

FIG. 11 is a schematic diagram further describing that the evaluation function $h^{(2)}$ is at the lower bound of the optimal solution. First, $b_i$ represents an item series of a certain state, and $b_i'$ represents an item series where $b_i$ has been sorted (refer to (1100) in the diagram). Next, the original problem is considered to be divided into a plurality of disjointed section problems (refer to (1120) in the diagram). Next, the optimal solution is queried to the pattern database 107 (refer to (1130) in the diagram). Herein, the minimum cost that sorts block $b_1$ into $b_1'$ is recorded in the pattern database 107. Furthermore, the operation when sorting does not affect the arrangement of the other blocks ($b_2$, $b_3$), so even if independently calculated and summed, the property of the lower bound is maintained. Note that the number of handling operations for the optimal solution of this instance is recorded in the pattern database 107. Herein, for the instance recorded in the pattern database 107, the position of the stack in the target state is restricted to one, and the initial state is set for all other stacks. Furthermore, in order to keep it a relaxed problem, the number of inventory yards and the number that can be simultaneously carried must be higher than or equal to the original problem.

Figure 12:
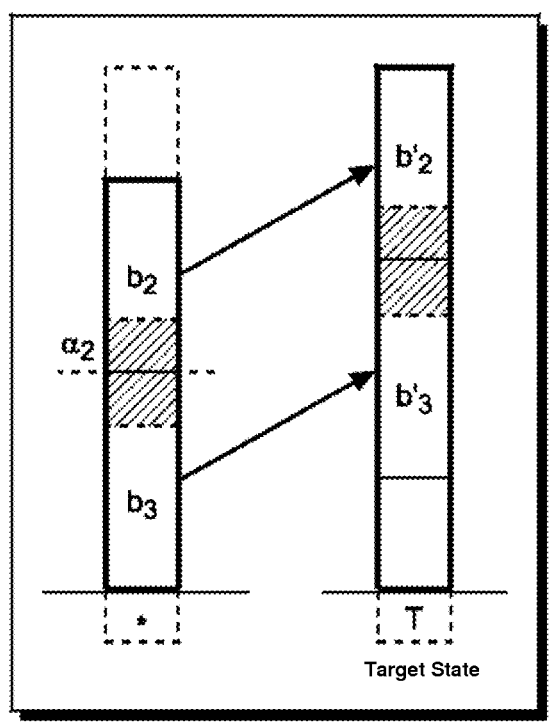

FIG. 12 is a schematic diagram further describing the calculation of α. For the case of α2, if the bottommost item of block b2 and the topmost item of b3 are consecutive in the target state, then α2=1, and otherwise, α2=0 (if the shaded sections are the same items even in the target state, then α2=0). This is based on the premise that the target state has a separate stack location from the initial state in the pattern database 107. Therefore, the cost of the optimal solution is larger by one when divided by originally consecutive sections, so in order to correct for this, the cost must be reduced by one.

The evaluation functions of the first embodiment and the second embodiment were described above.

The search module 104 searches for a route that minimizes the operating cost from the initial state to the target state on the state space graph using a heuristic search algorithm based on the lower bound obtained by the evaluation function of the first embodiment or the second embodiment (step S104). With the present embodiment, if the cost from the initial state to state n is provided as g(n), and if the estimated cost from state n to the target state is provided as h(n), A* algorithm searches in the order of g(n)+h(n). Note that in place of A* algorithm, IDA* (Iterative Deepening A*), SMA* (Simplified Memory-Bounded A*), A* with Partial expansion, or the like can be used for example as the heuristic search algorithm. Because these specific route searching methods are common knowledge, a detailed description has been omitted.

The output module 105 outputs the search results (step S105). For the output information, the optimal route from the initial state to the target state can be output to the display 18 as a crane handling operation sequence. Furthermore, information concerning the number of optimal steps (number of operations) of the optimal route from the initial state to the target state can be output to the production scheduler. A part of this information can be output to the user, and the other part of the information can be output to the production scheduler.

The embodiments of the present invention are described above in detail. Note that the technical scope of the present invention should not be interpreted as being restricted by the embodiments.

The inventors of the present invention repeated a number of tests until arriving at the present invention, but only a part of the tests are introduced herein, and the advantageous effects of the present invention are confirmed with regards to the existing technology.

FIG. 13 is a diagram describing the results of test 1. A test was conducted to verify to what degree that the search space is narrowed down, by comparing the method of the embodiments to Dijkstra's algorithm (hereinafter referred to as Dijkstra method) which is the standard conventional technology. As the experimental setting conditions, the initial state was randomly generated, and the number of expanded nodes, the number of unexpanded nodes, and the calculating time were measured for all instances and all methods. Herein, the number of items was 7 (this is the largest size that can realistically be solved by the Dijkstra method). The number of stack locations was 5; the maximum number of items that can be carried at once by a crane was 4; and the location of the stack in the target state was different than the location in the initial state. The "instance initial state" shows the arrangement of the items in the initial state.

Embodiment (1) is a heuristic $h^{(1)}$ that does not use the pattern DB, and embodiment (2) is a heuristic $h^{(2)}$ that uses the pattern DB. The number of expanded nodes (#closed-nodes) and the number of unexpanded nodes (#open nodes) are indices that are generally used as a metric for evaluating the calculation time and the required amount of memory in the performance evaluation of the search algorithm.

The experimental result shows that an instance, which requires a few minutes by the Dijkstra method to find an optimal solution, can be solved in less than one second by the embodiment of the present invention. Furthermore, for the reduction of the search space, a reduction effect of as much as 1/1000 was observed with the embodiment of the present invention as compared to the conventional means, based on the number of expanded nodes and the number of unexpanded nodes.

Test 2

FIG. 14 is a diagram describing the results of experiment 2. In the present experiment, a large scale instance was used that could not be realistically solved by the Dijkstra method, and the effects of the pattern DB were assessed. "the number of stack locations" and "the maximum number of items that can be carried at once by a crane" were the same as test 1. On the other hand, when the pattern DB was created, k=8, and "the number of stack locations" and the "maximum number of items that can be carried at once by a crane" were sufficiently large values. The number of items was 16, and the first three instances were generated completely at random; and the remaining 3 instances were generated by assuming a more realistic instance, randomly shuffling eight items 1 through 8 from the first half, and randomly shuffling eight items 9 through 16 from the second half (this is because in actuality, items are not usually scattered throughout, but rather scattering usually occurs relatively locally).

As a result of the experiment, in a relatively simple instance (where the solving time was relatively short), a noticeable difference in the size (number of expanded nodes and unexpanded nodes) of the search space was not observed, and the search space was larger using the pattern DB (this is considered to be a reverse phenomenon that occurs when the expansion order is determined at random between nodes that have the same evaluation value). On the other hand, in a relatively difficult instance, the effects of the pattern DB functioned favorably, the size of the search space was reduced by about ¼ in the best case, and the calculating time was reduced by about ⅓ in the base case.

The invention claimed is:

1. A system comprising:
   a crane; and
   a computer configured to:
   receive a current state of a plurality of stacks, wherein a stack from the plurality of stacks is used to store stackable inventory, and a state of the stacks comprises an order in which the stackable inventory is stored in the stacks;

determine a target state of the plurality of stacks based on a production schedule that is indicative of a sequence in which the stackable inventory is to be used;

identify one or more sequences of transitionable states to rearrange the inventory according to the target state from the current state, wherein a difference between consecutive transitionable states is a single operation;

calculate an operation cost of each of the sequences of transitionable states, based on a cost associated with movement of the inventory according to the transitionable states, and by identification of a plurality of cut-positions in the current state based on a comparison of the current state and the target state, wherein each cut-position is indicative of a separation for the crane to operate at least once, and wherein a first cut-position from the plurality of cut-positions is identified at a first position in the current state in response to:

the first position in the current state holding an inventory item that exists at a first target position in the target state; and a second position in the current state, which is adjacent to the first position, holding an inventory item that does not match a corresponding adjacent position in the target state;

select a sequence of transitionable states to rearrange the inventory from the current state to the target state that minimizes the operation cost by using a heuristic search algorithm to minimize a number of cut-positions; and instruct the crane to arrange the inventory according to the sequence of transitionable states selected from the one or more sequences of transitionable states.

2. The system of claim 1, wherein the cost associated with movement of the inventory includes a cost of operation of the crane.

3. The system of claim 2, wherein the inventory comprises manufactured products and semi-manufactured products.

4. The system of claim 1, wherein the production schedule comprises a schedule to use the inventory as intake products for a plurality of industrial processes.

5. The system of claim 4, wherein the computer is further configured to receive restriction information that restricts the movement of the inventory from one transitionable state to another transitionable state.

6. The system of claim 5, wherein the restriction information specifies a limit on a weight transferable in a single operation of the crane.

7. The system of claim 5, wherein the restriction information specifies a limit on a number of inventory transferable in a single operation of the crane.

8. The system of claim 5, wherein the restriction information specifies a limit on a number of inventory stackable in a single stack among the plurality of stacks.

9. An apparatus comprising:
an interface to communicate with a crane; and
a processor configured to:
receive a current state of a plurality of stacks, wherein a stack from the plurality of stacks is used to store stackable items, and a state of the stacks comprises an order in which the items are stacked in the stacks;
determine a target state of the plurality of stacks;
identify one or more sequences of transitionable states to rearrange the items according to the target state from the current state;
calculate an operation cost of each of the sequences of transitionable states, by identification of a plurality of cut-positions in the current state based on a comparison of the current state and the target state, wherein each cut-position is indicative of a separation for the crane to operate at least once, and wherein a first cut-position from the plurality of cut-positions is identified at a first position in the current state in response to:
the first position in the current state holding an inventory item that exists at a first target position in the target state; and
a second position in the current state, which is adjacent to the first position, holding an inventory item that does not match an inventory item at a corresponding position that is adjacent to the first target position in the target state;
select a sequence of transitionable states to arrange the items from the current state to the target state that minimizes the operation cost by minimization of a number of cut-positions; and
instruct the crane, via the interface, to arrange the items according to the sequence of transitionable states selected from the one or more sequences of transitionable states.

10. The apparatus of claim 9, wherein the target state is based on a production schedule that is indicative of a sequence in which the items are to be used.

11. The apparatus of claim 9, wherein a difference between consecutive transitionable states is a single operation.

12. The apparatus of claim 9, wherein the items are steel products after a steel manufacturing process and before a hot rolling process, the current state is a stacking state of the steel products after the steel manufacturing process, and the target state is the stacking state of the steel products suitable for the hot rolling process.

13. The apparatus of claim 9, wherein the processor is further configured to communicate the operation cost to a steel production scheduler in response to receipt of the current state and the target state from the production scheduler.

* * * * *